United States Patent
Walton

[15] 3,640,501
[45] Feb. 8, 1972

[54] VALVE SEAL RING INCLUDING METAL RETAINER RINGS

[72] Inventor: George W. Walton, 8903 Devonshire, Dallas, Tex. 75209

[22] Filed: Oct. 2, 1969

[21] Appl. No.: 863,274

[52] U.S. Cl. .................251/332, 137/DIG. 3, 137/533.29
[51] Int. Cl. ............................................F16k 15/06
[58] Field of Search ............251/332; 137/DIG. 3, 533.29, 137/533.25

[56] References Cited

UNITED STATES PATENTS

| | | | |
|---|---|---|---|
| 2,402,713 | 6/1946 | Volpin | 137/533.29 X |
| 1,002,938 | 9/1911 | Stange | 251/114 B |
| 1,914,737 | 6/1933 | Elms | 251/114 B |
| 1,966,264 | 7/1934 | Roye | 251/332 |
| 2,969,951 | 1/1961 | Walton | 251/332 |

FOREIGN PATENTS OR APPLICATIONS

| | | | |
|---|---|---|---|
| 1,251,698 | 12/1960 | France | 251/332 |

Primary Examiner—Arnold Rosenthal
Attorney—Hyer, Eickenroht, Thompson & Turner

[57] ABSTRACT

A valve having a metal ring with an annular seating surface at one end and a relief about the seating surface. A closure element moves toward and away from seating engagement with the seating surface, and a seal ring is mounted in the relief and has an end which protrudes above the seating surface of the metallic ring in position to be engaged by the closure element. There are circumferentially interfitting parts on the adjacent surfaces of the seal ring and relief, and a pair of metal retainer rings fit closely in grooves about the seal ring for holding the seal ring in the relief.

4 Claims, 3 Drawing Figures

PATENTED FEB 8 1972

3,640,501

George W. Walton
INVENTOR

BY *Hyer, Eickenroht & Thompson*
ATTORNEYS

VALVE SEAL RING INCLUDING METAL RETAINER RINGS

This invention relates to valves of the type used in controlling flow into and out of the cylinder of a piston type pump, and especially a pump for drilling muds or other fluids which are highly abrasive. More particularly, this invention relates to improvements in valves of this type, such as that disclosed in my earlier U.S. Pat. No. 2,969,951, wherein replaceable, and preferably end-for-end reversible, seal rings are mounted in a relief about a seat ring in position to be engaged by the closure element of the valve and urged into sealing engagement between the seat ring and closure element by back pressure in the pump.

In the above-mentioned valve, the adjacent walls of the seal ring and the relief about the seat ring have circumferentially interfitting parts, and a continuous, flat metal band surrounds the seal ring in order to hold the seal ring in position about the seat ring. In the replacement of this seal ring with another such ring, or in its reversal end-for-end, the interfitting parts on the inner surface of the seal ring must be distorted to permit it to slide over the inner wall of the relief and into the complementary interfitting parts on the adjacent wall thereof.

In the earlier valve, this manipulation of the seal ring requires considerable "brute force," even under the best of circumstances. Furthermore, this distortion of the seal ring during its movement into and out of place about the seat ring causes the outer surface of the seal ring to be forced against the sharp edges of the flat metal band, thereby tending to weaken the seal ring.

An object of this invention is to provide such a valve in which the seal ring is so constructed and mounted on the seat ring that it is more easily moved into and out of place about the seat ring, and further in which the tendency for damaging it due to its engagement with a metal retainer ring is considerably lessened.

These and other objects are accomplished, in accordance with the illustrated embodiments of the invention, by a valve of the type above described wherein the relief about the metal seat ring has an inner wall which is cylindrical, and the annular seal ring mounted in the relief has an inner cylindrical surface for fitting closely over the inner wall of the relief. As in the prior valve, the inner surface of the seal ring and inner wall of the seat ring relief have circumferentially interfitting parts intermediate their opposite ends. However, the cylindrical surface on the inner surface of the leading end of the seal ring slides easily over the outer end of the inner wall of the relief to guide the seal ring into an initial position on the relief. This, of course, facilitates movement of the interfitting parts on the seal ring over the outer end of the inner wall of the relief and into interfitting engagement with the corresponding parts on the inner wall of the relief as the seal ring moves into fully seated position in the relief.

There are two spaced-apart annular grooves about the outer surface of the seal ring, each groove having a base which is curved at each corner. A pair of metal retainer rings each has an inner side which conforms to and fits closely within one of the grooves so as to hold the seal ring in the seat relief. Thus, there are no sharp edges on the retainer ring for damaging the seal ring during the slight distortion involved in moving it into the relief. Preferably, the curved corners of the base of each groove intersects along the midportion of the base of the groove and are of such extent to form a groove base which is substantially semicircular in cross section, whereby the curved surfaces on the grooves will merely roll over the conforming surfaces on the retainer rings.

In the preferred embodiment of the invention, there are lips flaring outwardly from each end of the outer surface of the seal ring to facilitate urging of the seal ring into sealing engagement between the closure element and the seat ring in response to back pressure in the pump body. More particularly, the grooves for receiving the metal retainer rings are intermediate the opposite ends of the seal ring, and the seal ring is otherwise symmetrical end-for-end, so that it may be installed with either end in engagement with the base of the relief and the other end adjacent the seating surface on the seat ring for engagement by the closure element. In this way, the life of the seal ring is at least theoretically doubled inasmuch as it has two wear surfaces. Also, of course, the installer of a new seal ring need not be concerned as to which end is to be arranged adjacent the sealing surface of the seat ring.

In the drawings, wherein like reference characters are used throughout to designate like parts:

Figure 1:
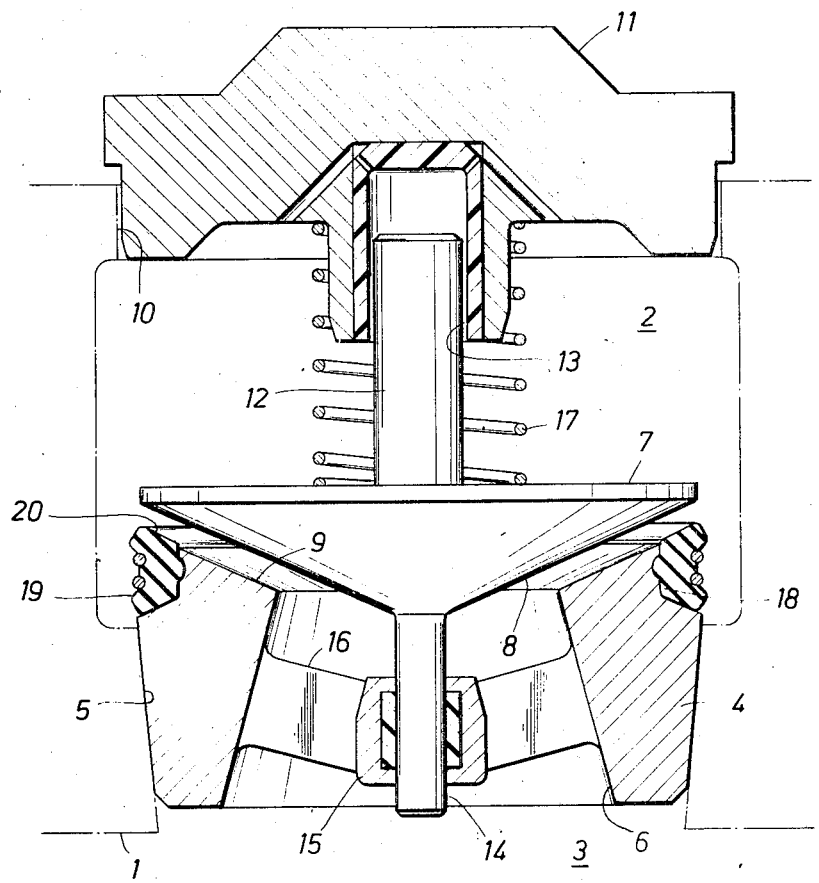
FIG. 1 is a vertical sectional view of a valve constructed in accordance with the present invention.

With reference now to the details of the above-described drawings, the overall valve is shown in FIG. 1 to be mounted within the valve pot of a mud pump having a deck 1 dividing it into a pressure chamber 2 above the deck and a section chamber 3 below the deck. As well known in this art, the valve may control flow into or out of the cylinder of the pump, depending on whether it is an intake or discharge valve.

The valve includes a seat ring 4 having conical outer side walls pressed into the hole 5 through the deck connecting the chambers 2 and 3, whereby flow between them is through the opening 6 through the seat ring. This flow opening through the seat ring is opened and closed by means of a closure element 7 having a lower conical surface 8 adapted to seat, in its closed position, upon a conforming conical seating surface 9 on the upper end of the seat ring 4. A hole 10 in the upper end of the pressure chamber 2 is closed by a cover 11. As shown in FIG. 1, the flow opening 6 is conical and converges upwardly from its lower to its upper end to provide a wide seating surface 9 for the element 7.

The closure element 7 has an upper stem 12 guidably slidable in a sleeve 13 depending from the lower side of the cover 11, and a lower stem 14 guidably received within a sleeve 15 carried by an arm 16 extending into the flow opening 6 from the inner side of the seat ring 4. A compression coil spring 17 is disposed between the lower side of the cover 11 and the top side of the closure element 7 for normally urging the closure element toward its closed position. As will be appreciated, in the event the valve is an inlet valve, the closure element 7 will be pulled downwardly to seated position during the suction stroke of the piston. On the other hand, in the event the valve is a discharge valve, the closure element will be urged to closed seated position during the return stroke of the piston.

The seat ring 4 has a relief 18 about one end of its outer side to receive a seal ring 19 of rubber or rubberlike material in position to form at its upper end 20 a continuation of the seating surface 9 on the seat ring. More particularly, the upper end of the seal ring 19 has a conical surface which, with the seal ring fully seated in the relief, protrudes from and is somewhat steeper than the conical seating surface 9 on the seat ring. Thus, as the closure element 7 moves to closed position, it will initially engage about the outer portion of the seating surface 20 of the seal ring 15, and then, upon deformation of the seating surface 20, seat upon the seating surface 9 of the seat ring 4. With the closure element 7 in closed position, pressure within the chamber 2 will act over the outer sides of the seal ring 19 for urging its upper and lower ends into tight-sealing engagement with the closure element 7 and the seat ring 4.

As shown, the base 22 of the relief has a conical surface of essentially the same angle as the conical seating surface 9 on the upper end of the seal ring 4, but extending below rather than from above a horizontal plane. Also, the seal ring 19 is symmetrical, end-for-end, so that its lower end surface 21 will tightly engage the base 22 of the relief, and in fact be deformed somewhat as it is moved against the base 22, much in the manner that the upper end surface 20 of the seal ring is deformed as the closure element 7 moves down into engagement with it.

Figure 2:
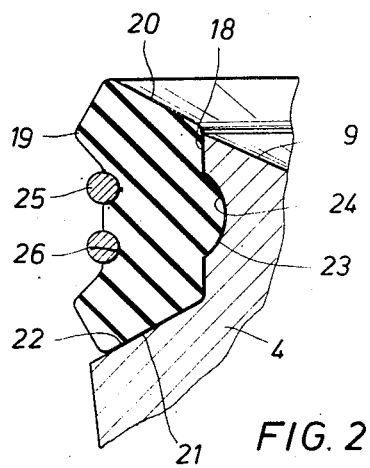
FIG. 2 is an enlarged sectional view of a portion of the seat ring and seal ring relief of the valve.

The inner wall of the relief 18 is cylindrical and concentric with the axis of the seat ring 4, and the inner surface of the seal ring 19 is also cylindrical for fitting closely about the inner wall of the relief as the seal ring is moved into the mounted position best shown in FIG. 2. More particularly, there is a flange 23 about the inner cylindrical surface of the seal ring 19 intermediate its upper and lower ends 20 and 21, which, as the seal ring is moved into mounted position in the relief, fits closely within a groove 24 having a shape conforming to the flange 23.

However, as previously mentioned, and in accordance with one of the novel aspects of the present invention, the cylindrical surface on the lower or leading end of the seal ring will initially move easily over the cylindrical surface on the upper end of the inner wall of the relief 18 so as to guide the seal ring as it initially moves toward mounted position in the relief. This, of course, avoids any need for distortion of the seal ring until such time that the lower edge of the flange 23 comes into engagement with the intersection of the upper end of the seat ring with the inner wall of the relief. At this time, however, since the movement of the seal ring into place has already been started, it is a relatively easy task to force it into fully seated position by pushing downwardly on it so as to cause the flange 23 to be distorted outwardly and thereby move over the upper cylindrical surface of the inner wall of the relief. As the seal ring then approaches its fully seated position, the flange 23 will move outwardly into the groove 24 and thus return to its undistorted position.

The seal ring is held securely in its seated position in the relief by means of a pair of continuous metal retainer rings 25 each disposed within a groove 26 of a pair of grooves about an intermediate cylindrical portion of the outer surface of the seal ring. More particularly, these grooves, and thus the retainer rings to be received within them, are disposed symmetrically end-for-end, so that with the two grooves and rings illustrated in FIG. 2, each groove is spaced an equal distance from the end-to-end midpoint of the seal ring.

In accordance with another novel aspect of the present invention, each groove has a base which, in the preferred embodiment of the invention shown in FIG. 2, is substantially semicircular in cross section, and each metal ring 25 received in the groove has an inner side which is also semicircular in cross section for conforming to the base of the groove 26. More particularly, each metal ring is round in cross section, as shown in the drawings, and the opposite ends of the semicircular base of the groove intersect with the outer surface of the seal ring, although it will be understood that each base could instead be spaced inwardly of the outer surface of the seal ring.

As also shown in the drawings, the outer surface of the seal ring includes outwardly flaring portions at each end of its outer cylindrical surface to form lips facilitating the application of pressure in the pump body for urging the seal rings into sealing engagement with the closure element and the seat ring.

Figure 3:
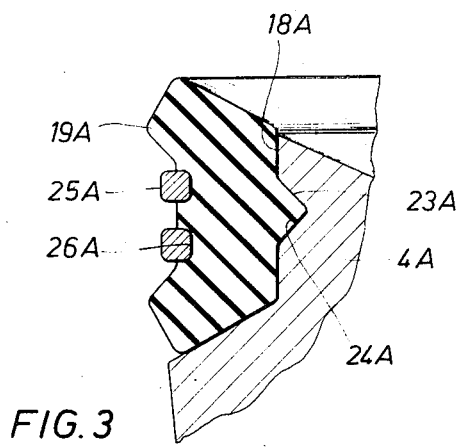
FIG. 3 is a sectional view similar to FIG. 2, but showing an alternative embodiment of the seat ring and seal ring relief.

In the embodiment of the invention illustrated in FIG. 3, the seat ring 4A and seal ring 19A are identical to the seat 4 and seal ring 19, respectively, described above in connection with FIGS. 1 and 2, with the exception of the interfitting parts on the inner surface of the seal ring and the inner wall of the relief in the seat ring and the particular construction of the retainer rings and grooves into which they fit.

Thus, as shown in FIG. 3, the flange 23A on the inner surface of the seal ring may be of triangular cross-sectional shape for fitting within a groove 24A of conforming shape in the inner wall of the relief 18A. Also, each groove 26A has a base which includes a relatively flat bottom portion intersecting with the sides of the groove along curved surfaces at each corner. The inner and outer sides of the retainer ring are similarly shaped to fit closely within the grooves.

It will be understood that although the invention has been illustrated and described in connection with a drilling mud pump, it is also applicable to valves for use in other piston-type pumps, such as water pumps, cementing pumps, acidizing pumps, etc.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. For use in a valve adapted to control flow into and out of the cylinder of a piston-type pump, a subassembly comprising an end-for-end symmetrical seal ring having an inner cylindrical surface, a circumferential flange on the inner surface of the seal ring intermediate its opposite end, a lip flaring outwardly from each opposite end of the outer surface of said seal ring, said outer surface of the seal ring having a pair of spaced-apart annular grooves thereabout intermediate the lips, the cross section of the base of each said groove having a mid portion and opposite ends and being curved intermediate said mid portion and each end, and a pair of metal retainer rings each having an inner side fitting closely in and conforming to the base of one of said grooves.

2. A subassembly of the character defined in claim 1, wherein each base of the groove is substantially semicircular in cross section.

3. A subassembly of the character defined in claim 1, wherein the base of the groove has a relatively flat bottom portion.

4. For use in controlling flow into and out of the cylinder of a piston-type pump, a valve having a onepiece metal seat ring having an annular seating surface at one end, a flow opening therethrough which is conical and converges towards its seating surface from one end of said ring to the other, and a relief about the outer circumference of the seating surface, a closure element movable toward and away from seating engagement with said seating surface, a seal ring mounted in the relief with one end seated on the base of the relief and the other end protruding above the seating surface of the metallic ring in position to be engaged by the closure element, said seal ring having an inner surface for fitting closely over the inner wall of the relief, said inner wall of the relief and inner surface of the seal ring respectively having a circumferential groove and flange interfitting with each other intermediate their opposite ends, the outer surface of the seal ring having a pair of spaced-apart annular grooves thereabout, the cross section of the base of each groove having a midportion and opposite ends and being curved intermediate said midportion and each end, and a pair of metal retainer rings each having an inner side conforming to and fitting closely within the base of one of said grooves.

* * * * *